US011859869B2

(12) United States Patent
Chaudhry et al.

(10) Patent No.: US 11,859,869 B2
(45) Date of Patent: Jan. 2, 2024

(54) SYSTEMS AND METHODS FOR INTEGRATING PHOTOVOLTAIC ENERGY INTO WATER HEATER SYSTEMS

(71) Applicant: Rheem Manufacturing Company, Atlanta, GA (US)

(72) Inventors: Raheel A. Chaudhry, Montgomery, AL (US); James Michael Reagin, Indianapolis, IN (US)

(73) Assignee: Rheem Manufacturing Company, Atlanta, GA (US)

( * ) Notice: Subject to any disclaimer, the term of this patent is extended or adjusted under 35 U.S.C. 154(b) by 354 days.

(21) Appl. No.: 16/908,814

(22) Filed: Jun. 23, 2020

(65) Prior Publication Data
US 2021/0396428 A1 Dec. 23, 2021

(51) Int. Cl.
*F24H 7/00* (2022.01)
*F24H 9/20* (2022.01)
*F24D 17/00* (2022.01)
*H02J 3/38* (2006.01)
*G05B 19/042* (2006.01)
*H02S 40/38* (2014.01)

(52) U.S. Cl.
CPC ......... *F24H 7/002* (2013.01); *F24D 17/0068* (2013.01); *F24H 9/2021* (2013.01); *G05B 19/042* (2013.01); *H02J 3/381* (2013.01); *H02S 40/38* (2014.12); *G05B 2219/2639* (2013.01); *H02J 2300/24* (2020.01)

(58) Field of Classification Search
CPC .... F24H 7/002; F24H 9/2021; F24D 17/0068; G05B 19/042; G05B 2219/2639; H02J 3/381; H02J 2300/24; H02S 40/38
See application file for complete search history.

(56) References Cited

U.S. PATENT DOCUMENTS

| 10,072,853 | B2 | 9/2018 | Chaudhry et al. |
| 10,605,465 | B2 | 3/2020 | Ferron et al. |
| 10,962,258 | B2 | 3/2021 | Bourke et al. |
| 11,041,640 | B2 | 6/2021 | Stepa et al. |
| 2009/0211567 | A1 | 8/2009 | Thomasson |
| 2011/0062248 | A1* | 3/2011 | Subramanian ........ F24H 9/2007 236/20 R |

(Continued)

FOREIGN PATENT DOCUMENTS

RU     2645391 C2     2/2018

OTHER PUBLICATIONS

International Search Report and Written Opinion received for PCT Application No. PCT/US2021/038330 dated Sep. 2, 2021.

*Primary Examiner* — Charles Cai
(74) *Attorney, Agent, or Firm* — Eversheds Sutherland (US) LLP

(57) ABSTRACT

Systems and methods for integrating photovoltaic (PV) energy into water heater systems are disclosed. The disclosed technology includes determining whether a current water temperature is less than a first PV heat point that is greater than a normal heat point, and if so, outputting instructions for PV energy to be transferred from a PV system to a heating device of the water heater. If the current water temperature falls below a second PV heat point that is less than the normal heat point, the disclosed technology includes outputting instructions for energy to be transferred from a utility system to the heating device.

20 Claims, 5 Drawing Sheets

(56) References Cited

U.S. PATENT DOCUMENTS

| | | |
|---|---|---|
| 2011/0203572 A1 | 8/2011 | Jackman |
| 2012/0091801 A1* | 4/2012 | Koshin .................... H02J 1/10 |
| | | 307/24 |
| 2016/0195284 A1* | 7/2016 | Chaudhry ........... F24D 19/1069 |
| | | 219/494 |
| 2018/0252417 A1* | 9/2018 | Komatsu ............. F24D 17/0015 |
| 2018/0278086 A1* | 9/2018 | Hall ...................... H02J 3/0073 |
| 2019/0195513 A1* | 6/2019 | Colon ................. F24D 11/0221 |
| 2021/0356172 A1* | 11/2021 | Porwal ..................... F24H 1/08 |

* cited by examiner

SYSTEMS AND METHODS FOR INTEGRATING PHOTOVOLTAIC ENERGY INTO WATER HEATER SYSTEMS

FIELD OF THE DISCLOSED TECHNOLOGY

The disclosed technology relates generally to systems and methods for integrating photovoltaic energy into water heater systems.

BACKGROUND

Today, many devices (e.g., heaters, boilers, etc.) can be efficiently powered by electricity and/or gas. Using such energy sources, however, can be expensive and/or can negatively impact the environment. Thus, it can be desirable to replace or supplement traditional energy sources with renewable energy. For example, photovoltaic energy (i.e., solar power) can provide energy harvested from received sunlight, providing electricity without many of the negative effects associated with traditional sources of gas and electrical energy.

Adoption of photovoltaic energy, however, is not without limitations. For example, there can be steep upfront costs associated with installing a photovoltaic energy system into a home, building, or other infrastructure. Beyond the upfront costs associated with purchasing and installing the photovoltaic system itself, there can be additional costs associated with purchasing and installing equipment designed to integrate with the photovoltaic system (whether the equipment is designed to integrate with the photovoltaic system alone or in combination with a traditional energy source). For example, a potential user of a photovoltaic system may have a water heater installed in her home that is perfectly functional but is not designed to integrate with a photovoltaic energy source. Thus, for this potential user to install a photovoltaic system, she would have to discard her functional water heater and replace it with a new water heater designed to integrate with photovoltaic systems. This can be unnecessarily wasteful and expensive, and such hurdles can be prohibitive for many potential users, thus limiting widespread adoption of photovoltaic systems.

Additional factors commonly attributed to inhibiting widespread adoption of photovoltaic energy systems include the weather dependency of photovoltaic systems (e.g., a strong need for sunny days) and temporal limitations of such systems (e.g., solar power cannot be harvested at night).

SUMMARY

These and other problems can be addressed by the technologies described herein. Examples of the present disclosure relate generally to water heater systems and, more specifically, to systems and methods for integrating photovoltaic energy into water heater systems.

The disclosed technology includes a method for integrating photovoltaic (PV) energy into a water heater. The method can include receiving a current water temperature from a water heater and can include determining whether the current water temperature is less than a first PV heat point that is greater than a normal heat point. The method can include calculating a required amount of energy to increase a temperature of the water from the current water temperature to a set point temperature. The method can include determining whether the required amount of energy is less than or equal to an amount of available PV energy in a PV system, and the method can include, in response to the required amount of energy being less than or equal to the amount of available PV energy, outputting a load-up command comprising instructions for PV energy to be transferred from the PV system to a heating device of the water heater.

The method can include performing a load-shed operation in response to (i) determining that the current water temperature is less than the normal heat point and (ii) determining that the required amount of energy is greater than an updated amount of available PV energy in the PV system.

The load shed operation can include, in response to determining that the current water temperature is less than a second PV heat point; determining whether the required amount of energy is less than or equal to a new updated amount of available PV energy in the PV system. The load shed operation can include, in response to the required amount of energy being less than or equal to the new updated amount of available PV energy, outputting instructions for PV energy to be transferred from the PV system to the heating device of the water heater.

The method can include, in response to the required amount of energy being greater than the new updated amount of available PV energy, outputting instructions for energy to be transferred from a utility system to the heating device of the water heater.

The disclosed technology includes a controller, and the disclosed technology includes a water heater system that includes the controller. The controller can be configured to perform some or all of the various methods described herein.

The controller can be attachable to the water heater.

The controller can be configured to communicate with a local controller of the water heater.

The controller can be configured to communicate with the local controller via a communication port of the water heater.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

Figure 1:
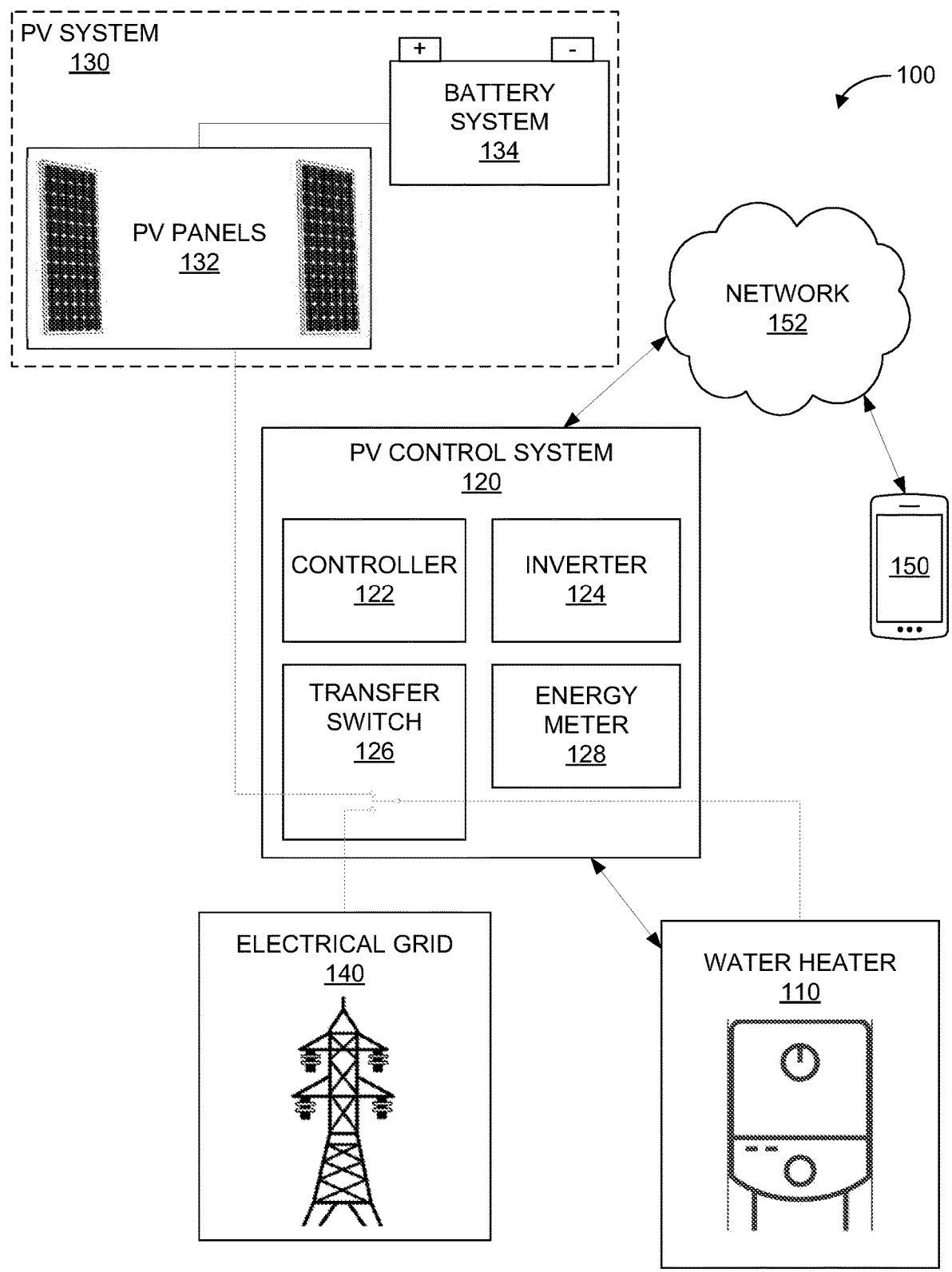
FIG. 1 illustrates a diagram of an example system, in accordance with the disclosed technology.

Throughout this disclosure, systems and methods are described with respect to integration of a photovoltaic system into a water heater system. Those having skill in the art will recognize that the disclosed technology can be applicable to multiple scenarios and applications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Although the disclosed technology may be described herein with respect to various systems, non-transitory computer-readable mediums having instructions stored thereon, and methods, it is contemplated that embodiments or implementations of the disclosed technology with identical or substantially similar features may alternatively be implemented as methods, systems, and/or non-transitory computer-readable media. For example, any aspects, elements, features, or the like described herein with respect to a method can be equally attributable to a system and/or a non-transitory computer-readable medium. As another example, any aspects, elements, features, or the like described herein with respect to a system can be equally attributable to a method and/or a non-transitory computer-readable medium. As yet another example, any aspects, elements, features, or the like described herein with respect to a non-transitory computer-readable medium can be equally attributable to a system and/or a method.

And while the disclosed technology is described herein with respect to water heaters and water heating applications, it is to be understood that the technology is not limited to water and can be applicable to the heating of any liquid.

Reference will now be made in detail to example embodiments of the disclosed technology, examples of which are illustrated in the accompanying drawings and disclosed herein. Wherever convenient, the same reference numbers will be used throughout the drawings to refer to the same or like parts.

FIG. 1 shows an example system 100 for integrating photovoltaic power into water heating applications. The system 100 can include a water heater 110, a photovoltaic (PV) control system 120, and a PV system 130 that includes PV panels 132. The PV system 130 can optionally include a battery system 134. The water heater 110 can be a heat pump water heater, a storage-tank water heater, a water heater having one or more resistive heating elements, or any other type of water heater configured to operate using electricity. The PV panels 132 can be configured to receive solar radiation and covert the solar radiation into electricity, and the PV panels 132 can be configured to supply electricity to one or more devices directly as the PV panels 132 harvest the electricity. Alternatively, or additionally, the PV panels 132 can be configured to store harvested electricity in a battery system 134 for subsequent use.

The PV control system 120 can be in electrical communication with the PV panels 132 and/or battery system 134 such that the PV control system 120 can control the transfer of electricity from the PV panels 132 and/or battery system 134 to the water heater 110. The PV control system 120 can include a controller 122 for controlling operation of the PV control system 120 and communicating with (and/or controlling) the water heater 110, an inverter 124 for converting direct current (DC) energy from the PV panels 132 and/or battery system 134 to alternating current (AC) for the water heater 110, and an energy meter 128 for monitoring the amount of energy currently available from the PV panels 132 and/or battery system 134.

The controller 122 can include one or more processors and memory storing instructions that, when executed by the processor(s), cause the controller 122 to perform certain actions, such as those described herein. For example, the controller 122 can be configured to determine when and whether to provide energy to the water heater 110 from the PV system 130 or the electrical grid 140 or another utility (e.g., natural gas, provided the water heater's 110 heating device 220 is configured to operate using natural gas). The controller 122 can further include a transceiver and/or a display, among other things. The controller 122 can be also be configured to communicate with a remote computing device 150. The controller 122 can communicate with the computing device 150 directly or via a network 152. Additionally or alternatively, the controller 122 can communicate with other computing devices, such as a computing device associated with a utility service provider or another entity. As an example, the controller 122 can be configured to provide use data to the user (e.g., via computing device 150) and/or a utility service provider. As another example, the controller 122 can receive commands and/or user inputs (e.g., set point values, threshold values) from the computing device 150 or another device (e.g., via a website, via a dedicated app installed on the computing device 150). Alternatively or additionally, the controller 122 can communicate with one or more remote servers (e.g., the cloud), which can store information associated with the system 100 (or component(s) thereof) and/or can enable access to the information for one or more computing devices, for example. The network 152 can be of any suitable type, including individual connections via the internet such as cellular or WiFi networks. The network 152 can connect computers, services, and mobile devices using direct connections such as radio-frequency identification (RFID), near-field communication (NFC), Bluetooth™, low-energy Bluetooth™ (BLE), Wi-Fi™, ZigBee™, ambient backscatter communications (ABC) protocols, USB, WAN, or LAN.

Figure 2:
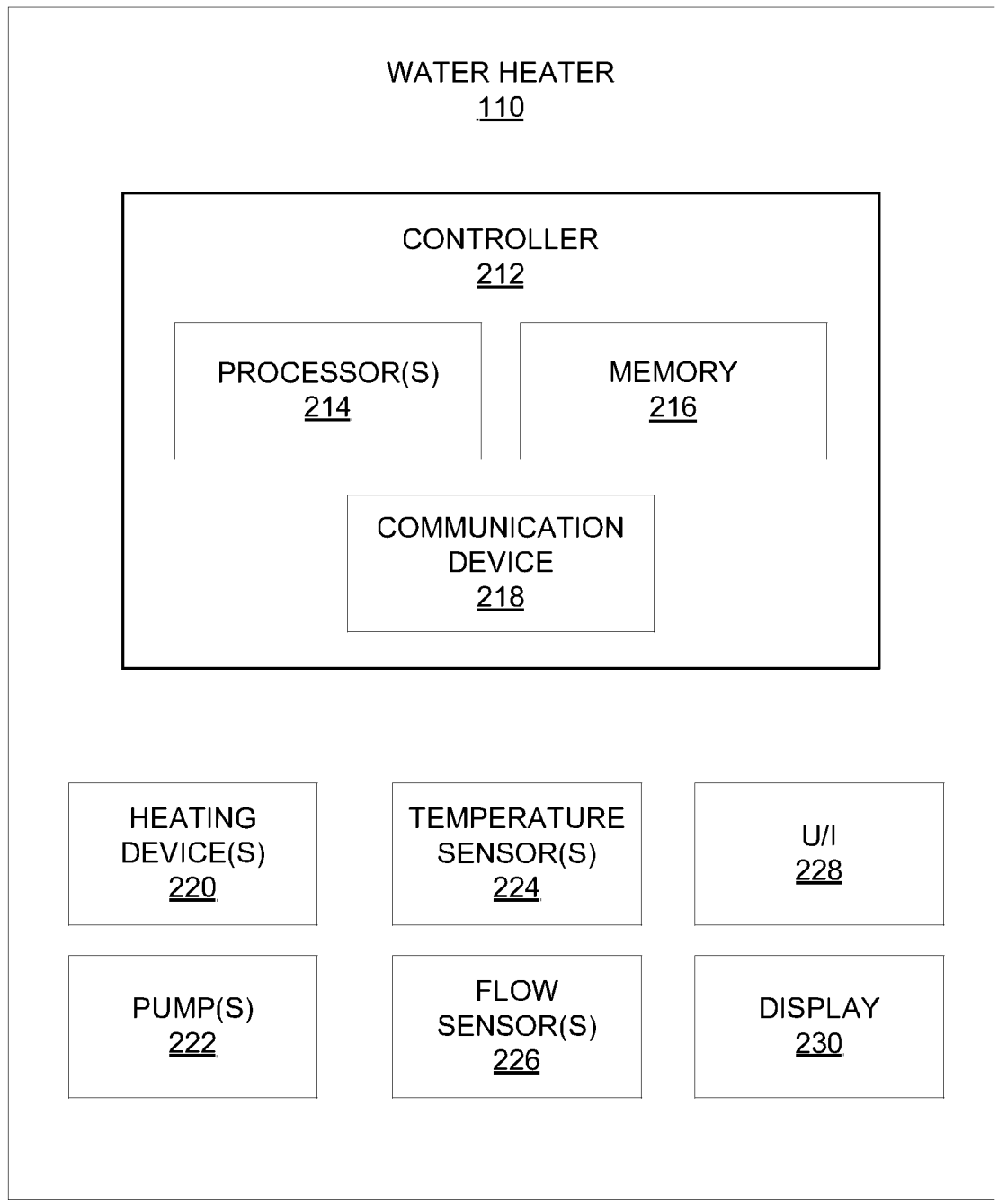
FIG. 2 illustrates a component diagram of an example water heater, in accordance with the disclosed technology.

Referring to FIG. 2, the water heater 110 can include a local controller 212, which can include one or more processors 214 and memory 216 storing instructions that, when executed by the processor(s) 214, cause the controller 212 to perform certain actions such as those described herein. The water heater 110 can include a communication device 218, which can be or include a communication port (e.g., a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, or the like) and/or a transceiver (e.g., capable of communicating via as RFID, NFC, Bluetooth™, BLE, Wi-Fi™, ZigBee™, ABC protocols, USB, WAN, LAN, or the like). The water heater 110 can include one or more heating device(s) 220 (e.g., resistive heating, various heat pump components) configured to provide heat to water or another fluid; one or more pumps 222; one or more temperature sensors 224 configured to detect and transmit a temperature of the water; one or more flow sensors configured to detect and transmit a flow rate of the water; a user interface (U/I) device 228 for receiving user input data, such as data representative of a click, a scroll, a tap, a press, or typing on an input device that can detect tactile inputs; and/or a display 230 for display for displaying images or text.

Referring back to FIG. 1, the controller 122 of the PV control system 120 can act as a master controller (e.g., provide instructions to the local controller 212 of the water heater 110) or the controller 122 can interface (e.g., communicate information) with the water heater's 110 local controller 212. Stated otherwise, the various aspects and functionalities described herein can be performed by the controller 122 of the PV control system 120, the controller 212 of the water heater 110, or any combination thereof.

The controller 122 can be removably attachable to the water heater 110 (e.g., physically attached to the water heater 110) and/or connectable to the water heater 110 (e.g., communicably connected via the communication device 218. The controller 122 can optionally be communicably connected to the computing device 150, which can be a user device (e.g., a computing device, a mobile device, a smart phone) or a remote server.

To integrate photovoltaic capabilities into the water heater 110, the controller 122 can establish communication with the heater 110 via a communication port (not shown). As mentioned above, the controller 122 can be physically attached to the heater 110, or the controller 122 can communicate remotely with the heater 110 using, for example, Bluetooth®, Wi-Fi, RS-485, radio, hardwired topologies, or any other suitable manner. Once communication between the heater 110 and the controller 122 is established, the controller 122 can receive data from the heater 110, which can include a current temperature of the available heated water and an amount of the available heated water. The controller 122 can compare the current water temperature to stored temperature values and/or stored temperature ranges such as, for example, a set point temperature or normal upper threshold value (e.g., 120° F.), a first PV heat point or load-up heat point (e.g., 118° F.), a normal heat point or normal lower threshold value (e.g., 110° F.), and a second PV heat point or load-shed heat point (e.g., 105° F.). The set point temperature can represent the target temperature for heated water produced by the water heater 110.

As will be appreciated, traditional water heaters typically engage a heating device to transfer heat to the water when the current water temperature decreases to below the normal heat point (e.g., normal lower threshold value). Such water heaters continue to heat the water until the current water temperature is equal to the set point temperature (e.g., normal upper threshold value). Traditional water heaters then typically deactivate the heating device until the current water temperature again decreases to below the normal heat point, at which time the water heaters will again activate the heating device.

The disclosed technology, however, can take advantage of power from the PV system 130. The controller 122 receives water temperature data from a temperature sensor of the water heater 110 and compares the current water temperature to several temperature thresholds. As with existing systems, water can be heated until the water temperature reaches the set point temperature, at which time the controller 122 can output instructions for the heating device 220 of the water heater 110 to deactivate and stop providing heat to the water. After the heating device 220 is deactivated, the water temperature will eventually decrease. The controller 122 can receive continuous or periodic temperature data indicative of the current water temperature.

When the current water temperature is approximately less than or approximately equal to the first PV heat point, the controller can determine (e.g., based on the energy meter 128) whether the PV system 130 has sufficient energy or power to heat the water within the water heater from the current water temperature to the set point temperature. Sufficient energy or power can refer to the PV system 130 being able to provide an amount of energy or power that is greater than or equal to the amount of energy or power required to heat the water within the water heater from the current water temperature to the set point temperature. The controller 122 can determine the amount of energy required to heat the water within the water heater from the current water temperature to the set point temperature. For example, the controller 122 can determine the amount of energy required based on the current water temperature, the set point temperature, the amount of heat outputted by the heating device 220 (e.g., average heated output), and the amount of water to be heated. Determining whether the PV system has sufficient energy can include determining whether sufficient energy is stored in the battery system 134, whether the PV panels 132 are presently harvesting sufficient energy, or a combination thereof.

If the PV system 130 does have sufficient energy to heat the water within the water heater from the current water temperature to the set point temperature, the controller 122 can output a load up command, which can include outputting instructions for transfer switch 126 to route energy from the PV system 130 to the heating device 220. If the heating device 220 is DC powered, energy can be routed directly to the heating device 220. If the heating device 220 is AC powered, energy can be routed to the heating device 220 via the inverter 124 such that DC power from the PV system 130 can be converted to AC power. The controller 122 can output instructions for the transfer switch 126 to permit a flow of energy to the heating device 220 until the current water temperature is approximately equal to the set point temperature, at which time the controller can output instructions for the transfer switch 126 to stop the flow of energy from the PV system 130 and/or outputs instructions for the heating device 220 to deactivate.

If the PV system 130 does not have sufficient energy, the controller 122 can continue to monitor incoming temperature data and the available energy of the PV system 130 without outputting instructions to other components of the system 100, unless and until another temperature threshold is met. The current water temperature can continue to decrease until it reaches the normal heat point. The normal heat point, as described above, is typically the lower endpoint of a traditional water heater's operational range; this is the temperature at which traditional water heaters typically activate the heating device 220 to begin heating the water toward the set point temperature. The disclosed technology, however, tends to favor the use of renewable power from the PV system 130. Thus, if the PV system 130 does not have sufficient energy when the current water temperature is approximately equal to the normal heat point, the controller 122 can output a load-shed command (or perform a load-shed operation), which corresponds to delaying activation of the heating device 220, in case the PV system 130 harvests or otherwise gains sufficient energy to heat the water to the set point temperature. The current water temperature can continue to decrease until it reaches the second PV heat point. If at any time during the load-shed operation (or at any time at which the current water temperature is approximately less than the first PV heat point), the PV system 130 has sufficient energy to heat the water within the water heater from the current water temperature to the set point temperature, the controller 122 can output instructions for providing energy from the PV system 130 to the heating device 220 to heat the water to the set point temperature. If, however, the current water temperature becomes approximately equal to the second PV heat point, the controller 122 can output instructions for the transfer switch 126 to permit a flow of energy from the electrical grid 140 to the heating device 220. Thus, if there is insufficient energy from the PV system 130 to heat the water, the electrical grid 140 can function as a backup energy source. This can help ensure that the water stays sufficiently heated for the comfort of users.

Figure 3A:
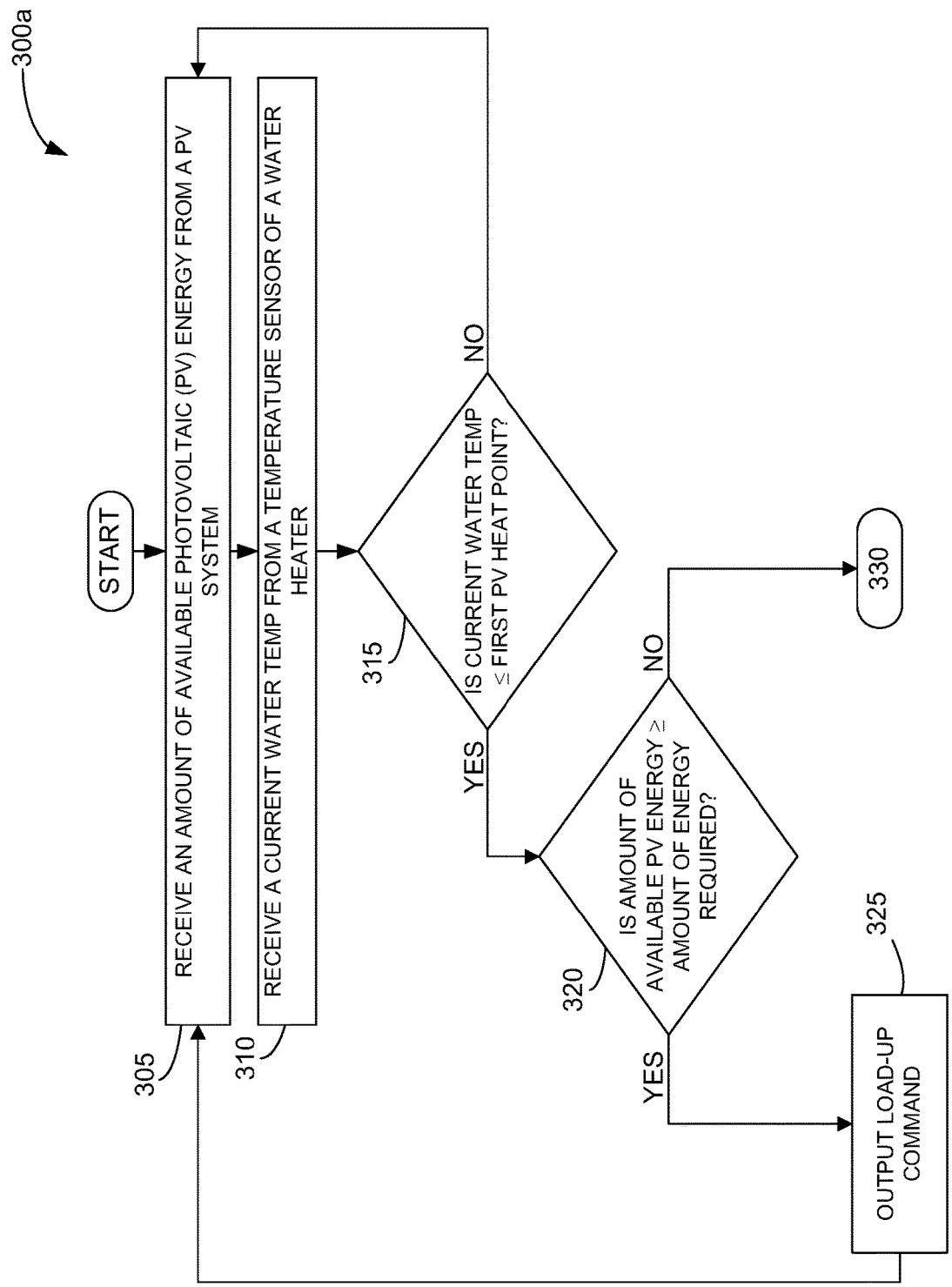
FIGS. 3A-3C illustrate flowcharts of example methods for integrating photovoltaic energy into water heater systems, in accordance with the disclosed technology.
Figure 3B:
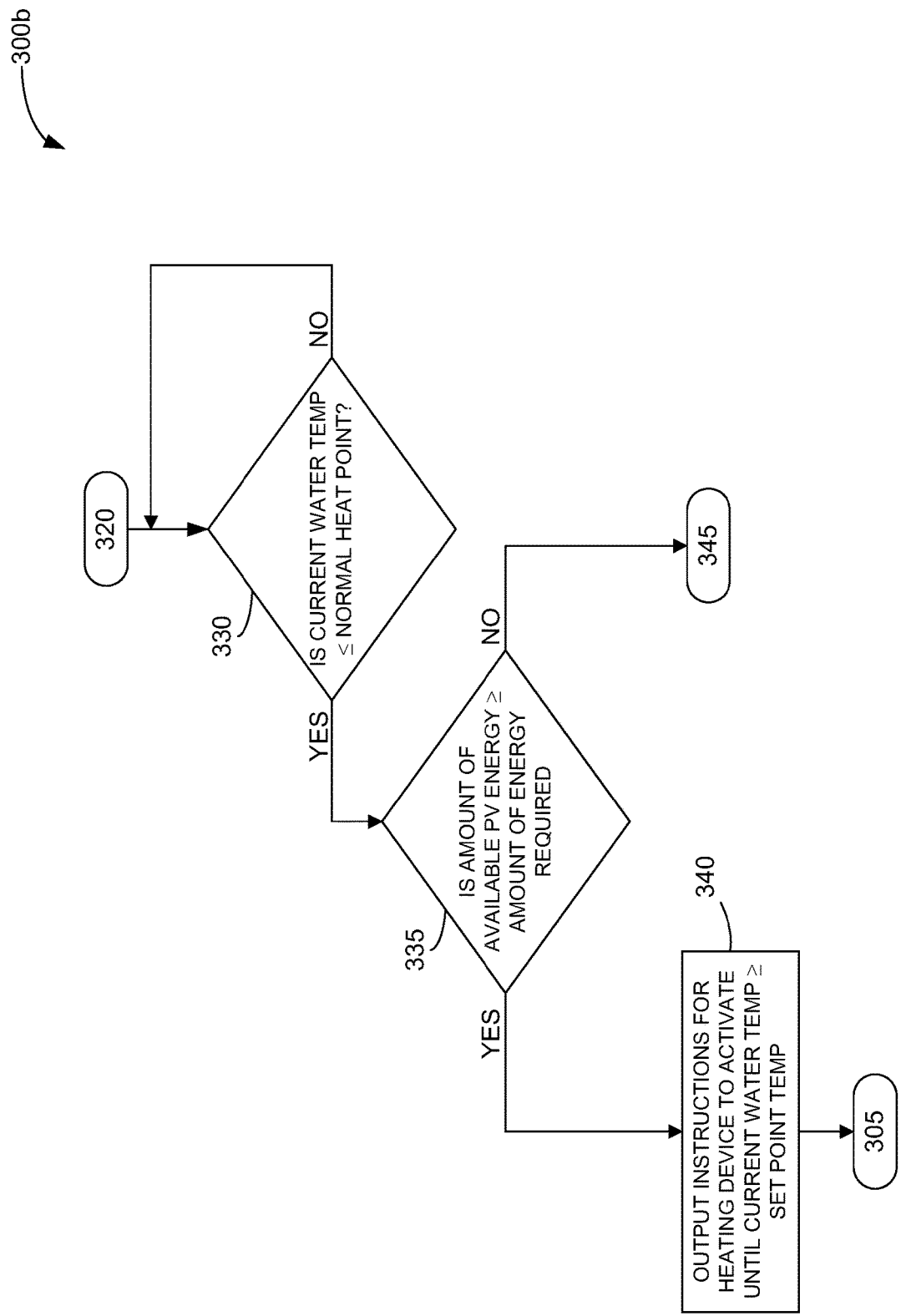
Figure 3C:
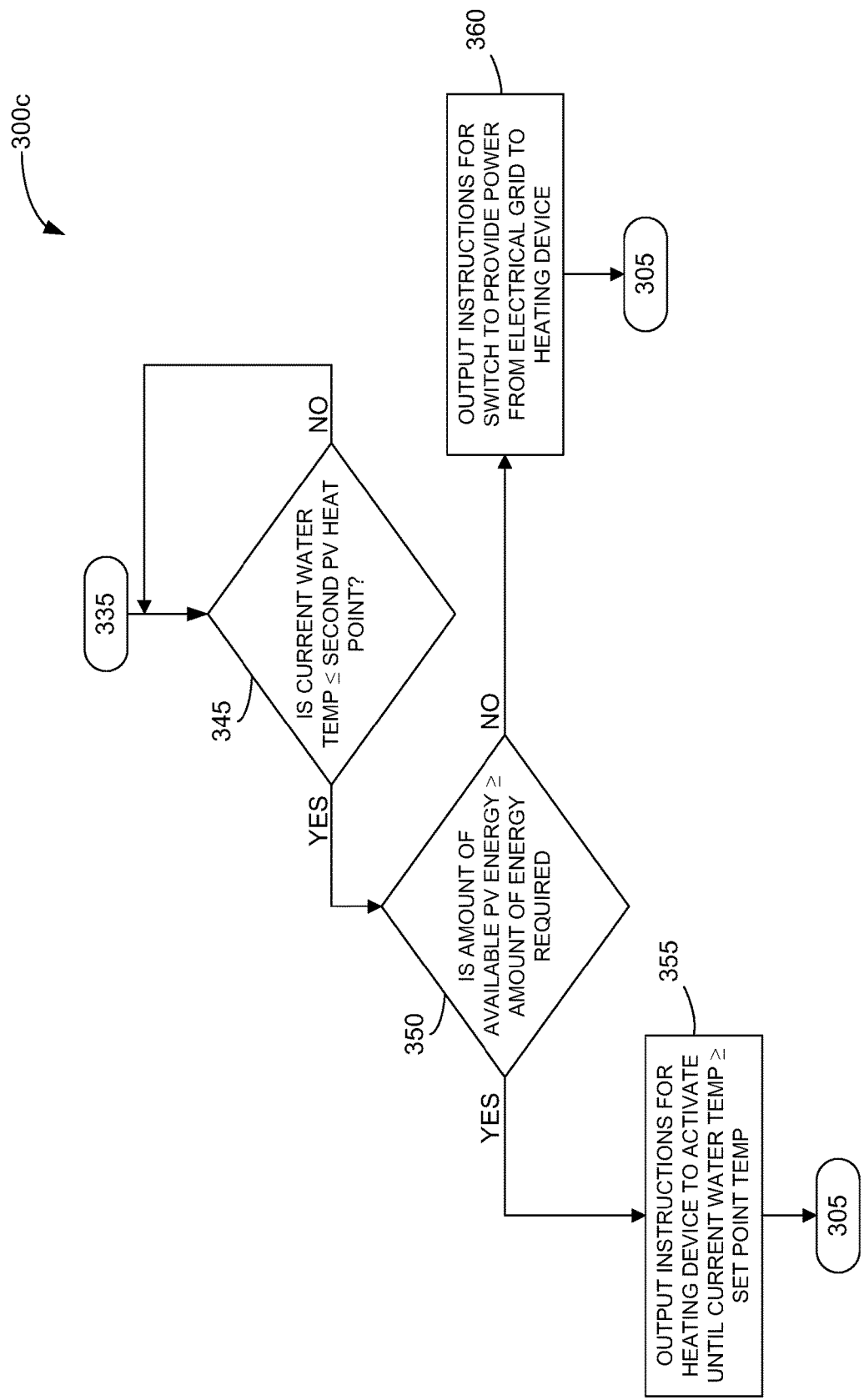

FIGS. 3A-3C provide flowcharts depicting example methods 300a, 300b, and 300c, respectively, which can combine to form method 300. The method 300 can include receiving 305 (e.g., by a controller, such as controller 122) an amount of available PV energy from a PV system (e.g., PV system 130), and the method 300 can include receiving 310 a current water temperature from a temperature sensor (e.g., temperature sensor 224) of a water heater (e.g., water heater 110) (or a current average water temperature if the water heater includes multiple temperature sensors). The method 300 can include determining 315 whether the current water temperature is approximately less than or approximately equal to a first PV heat point. If no, the method 300 can restart.

If the current water temperature is approximately less than or approximately equal to the first PV heat point, the method 300 can include determining 320 whether the amount of available PV energy of the PV system (e.g., as indicated by an energy meter such as energy meter 128) is greater than or equal to the amount of energy required for the heating device (e.g., heating device 220) to heat the water in the water heater from the current water temperature to the set point temperature. The method can optionally include determinizing the amount of energy required to heat the water or receiving an indication (e.g., from the water heater) of the amount of energy required to heat the water.

If the amount of available PV energy is greater than or equal to the amount of energy required to heat the water, the method 300 can include outputting 325 a load-up command. Outputting the load-up command can include outputting instructions for a transfer switch (e.g., transfer switch 126) to route energy from the PV system to the heating device. If the heating device is DC powered, the method 300 can include routing energy directly to the heating device, whereas if the heating device is AC powered, the method 300 can include routing energy to the heating device via an inverter (e.g., inverter 124) such that DC power from the PV system can be converted to AC power for the heating device. Outputting the load-up command can include outputting instructions for the transfer switch to permit a flow of energy to the heating device until the current water temperature is approximately equal to the set point temperature, at which time instructions are outputted for the transfer switch to stop the flow of energy from the PV system and/or instructions are outputted for the heating device to deactivate. After the load-up command has been completed, the method can restart.

Turning from FIG. 3A to FIG. 3B, if the amount of available PV energy is less than the amount of energy required to heat the water, the method 300 can include determining 330 whether the current water temperature is approximately less than or approximately equal to a normal heat point. If no, the method 300 can repeat the determination 330 until the current water temperature is approximately less than or approximately equal to the normal heat point. Once the current water temperature is less than or approximately equal to the normal heat point, the method 300 can include determining 335 whether the amount of available PV energy is greater than or equal to the amount of energy required to heat the water. If yes, the method 300 can include outputting 340 instructions for the heating device to active, such as by the same or similar methods as described above with respect to the load-up command.

Turning now from FIG. 3B to FIG. 3C, if the amount of available PV energy is less than the amount of energy required to heat the water, the method 300 can include performing a load-shed process or method 300c. That is, the method can include determining 345 whether the current water temperature is less than or approximately equal to a second PV heat point. If no, the method 300 can repeat the determination 345 until the current water temperature is approximately less than or approximately equal to the second PV heat point.

If the current water temperature is less than or approximately equal to the second PV heat point, the method can include determining 350 whether the amount of available PV energy is greater than or equal to the amount of energy required to heat the water. If yes, the method 300 can include outputting 355 instructions for the heating device to active, such as by the same or similar methods as described above with respect to the load-up command, and the method 300 can then restart. If no, the method 300 can include outputting 360 instructions for the transfer switch to provide power from an electrical grid (e.g., electrical grid 140) or other utility to the heating device until the current water temperature is greater than or approximately equal to the set point temperature, and the method 300 can then restart. Regarding the various points at which the method 300 can restart, the method 300 can include waiting a predetermined time before restarting and/or re-evaluating whether there is a sufficient amount of PV energy for heating the water to the set point temperature.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "one example," "an example," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Further, certain methods and processes are described herein. It is contemplated that the disclosed methods and processes can include, but do not necessarily include, all steps discussed herein. That is, methods and processes in accordance with the disclosed technology can include some of the disclosed while omitting others. Moreover, methods and processes in accordance with the disclosed technology can include other steps not expressly described herein.

Throughout the specification and the claims, the following terms take at least the meanings explicitly associated herein, unless otherwise indicated. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving, by at least one processor of a control system of a water heater, a current water temperature from the water heater;
   determining, by the at least one processor, that the current water temperature is less than a first PV heat point that is greater than a normal lower threshold heat point;
   in response to the current water temperature being less than the first PV heat point, calculating, by the at least one processor, a required amount of energy to increase a temperature of the water from the current water temperature to a set point temperature greater than the first PV heat point;
   determining, by the at least one processor, that the required amount of the energy is greater than an amount of available PV energy in a PV system at a first time;
   in response to the required amount of the energy being greater than the amount of the available PV energy at the first time, determining, by the at least one processor, that the current water temperature is less than or equal to the normal lower threshold heat point;
   in response to the current water temperature being less than or equal to the normal lower threshold heat point, determining, by the at least one processor, that the amount of the available PV energy is greater than or equal to the required amount of the energy at a second time; and
   in response to the amount of the available PV energy being greater than or equal to the required amount of the energy at the second time, setting, by the at least one processor, a switch of the control system to transfer PV energy from the PV system to a heating device of the water heater, until the current water temperature is greater than or equal to the set point temperature, and to not transfer energy from a utility system to the heating device.

2. The method of claim 1, further comprising setting, by the at least one processor, the switch to stop the transfer of the PV energy from the PV system to the heating device and from the utility system to the heating device based on detecting that the current water temperature equals the set point temperature.

3. The method of claim 1 further comprising:
   receiving, from an energy meter, an indication of the amount of the available PV energy.

4. The method of claim 1 further comprising:
   in response to the required amount of the energy being greater than the amount of the available PV energy and subsequent to expiration of a predetermined period of time, determining, by the at least one processor, whether the required amount of the energy is less than or equal to an updated amount of the available PV energy in the PV system.

5. The method of claim 1 further comprising:
   in response to determining that the current water temperature is less than the normal lower threshold heat point, determining, by the at least one processor, whether the required amount of the energy is less than or equal to an updated amount of the available PV energy in the PV system; and
   in response to the required amount of the energy being greater than the updated amount of the available PV energy, setting, by the at least one processor, the switch to not transfer the updated amount of the available PV energy to the heating device.

6. The method of claim 5, further comprising:
   in response to determining that the current water temperature is less than a second PV heat point lower than the normal lower threshold heat point, determining, by the at least one processor, at a third time, whether the required amount of the energy is less than or equal to a new updated amount of the available PV energy at the third time in the PV system; and in response to the required amount of the energy being less than or equal to the new updated amount of the available PV energy at the third time, setting, by the at least one processor, the switch to transfer the PV energy from the PV system to the heating device.

7. The method of claim 6 further comprising:
setting, by the at least one processor, the switch to stop the transfer of the PV energy from the PV system to the heating device based on detecting that the current water temperature equals the set point temperature.

8. The method of claim 1 further comprising:
setting, by the at least one processor, the switch to not transfer the energy from the utility system to the heating device based on detecting that the current water temperature equals the set point temperature.

9. A controller for controlling operation of a water heater, the controller comprising:
one or more processors;
a switch; and
a non-transitory computer-readable medium having instructions stored thereon that, when executed by the one or more processors, cause the controller to:
receive a current water temperature from the water heater;
determine that the current water temperature is less than a first PV heat point that is greater than a normal lower threshold heat point;
in response to the current water temperature being less than the first PV heat point, calculate a required amount of energy to increase a temperature of the water from the current water temperature to a set point temperature greater than the first PV heat point;
determine whether that the required amount of the energy is greater than an amount of available PV energy in a PV system at a first time;
in response to the required amount of the energy being greater than the amount of available PV energy at the first time, determine that the current water temperature is less than or equal to the normal lower threshold heat point;
in response to the current water temperature being less than or equal to the normal lower threshold heat point, determine that the amount of the available PV energy at a second time is greater than or equal to the required amount of the energy; and
in response to the amount of the available PV energy being greater than or equal to the required amount of the energy at the second time, set the switch to transfer PV energy from the PV system to a heating device of the water heater, until the current water temperature is greater than or equal to the set point temperature, and to not transfer energy from a utility system to the heating device.

10. The controller of claim 9, wherein the instructions, when executed by the one or more processors, further cause the controller to set the switch to stop the transfer of the PV energy from the PV system to the heating device based on detecting that the current water temperature equals the set point temperature.

11. The controller of claim 9, wherein the instructions, when executed by the one or more processors, further cause the controller to:
receive, from an energy meter, an indication of the amount of the available PV energy.

12. The controller of claim 9, wherein the instructions, when executed by the one or more processors, further cause the controller to:
in response to the required amount of the energy being greater than the amount of the available PV energy and subsequent to expiration of a predetermined period of time, determine whether the required amount of the energy is less than or equal to an updated amount of the available PV energy in the PV system.

13. The controller of claim 9, wherein the instructions, when executed by the one or more processors, further cause the controller to:
in response to determining that the current water temperature is less than the normal lower threshold heat point, determine whether the required amount of the energy is less than or equal to an updated amount of the available PV energy in the PV system; and
in response to the required amount of the energy being greater than the updated amount of the available PV energy, set the switch to not transfer the updated amount of the available PV energy to the heating device.

14. The controller of claim 13, wherein the instructions, when executed by the one or more processors, further cause the controller to:
in response to determining that the current water temperature is less than a second PV heat point lower than the normal lower threshold heat point at a third time, determine whether the required amount of the energy is less than or equal to a new updated amount of the available PV energy at the third time in the PV system; and
in response to the required amount of the energy being less than or equal to the new updated amount of the available PV energy at the third time, set the switch to transfer the PV energy from the PV system to the heating device.

15. The controller of claim 14, wherein the instructions, when executed by the one or more processors, further cause the controller to:
set the switch to stop the transfer of the PV energy from the PV system to the heating device based on detecting that the current water temperature equals the set point temperature.

16. The controller of claim 14, wherein the instructions, when executed by the one or more processors, further cause the controller to:
set the switch to stop the transfer of the energy from the utility system to the heating device based on detecting that the current water temperature equals the set point temperature.

17. The controller of claim 9, wherein the controller is in communication with a local controller of the water heater.

18. The controller of claim 9, wherein the controller is attachable to the water heater.

19. The method of claim 1, wherein the switch operatively connects the control system to the PV system and to the utility system.

20. A system for switching between power sources of a water heater, the system comprising:
the water heater; and
a switch operatively connecting a controller to a PV system and to a utility system, the controller comprising a one or more processors and a non-transitory computer-readable medium having instructions stored thereon that, when executed by the one or more processors, cause the controller to:

receive a current water temperature from the water heater;

determine whether that the current water temperature is less than a first PV heat point that is greater than a normal lower threshold heat point;

in response to the current water temperature being less than the first PV heat point, calculate a required amount of energy to increase a temperature of the water from the current water temperature to a set point temperature;

determine whether that the required amount of the energy is greater than an amount of available PV energy in the PV system at a first time;

in response to the required amount of the energy being greater than the amount of available PV energy at the first time, determine that the current water temperature is less than or equal to the normal lower threshold heat point;

in response to the current water temperature being less than or equal to the normal lower threshold heat point, determine that the amount of the available PV energy is greater than or equal to the required amount of the energy at a second time; and in response to the amount of the available PV energy being greater than or equal to the required amount of the energy at the second time, set the switch to transfer PV energy from the PV system to a heating device of the water heater, until the current water temperature is greater than or equal to the set point temperature, and to not transfer energy from the utility system to the heating device.

\* \* \* \* \*